(12) United States Patent
Loccufier (10) Patent No.: US 10,752,782 B2
(45) Date of Patent: Aug. 25, 2020

(54) RADIATION CURABLE COMPOSITIONS

(71) Applicant: AGFA NV, Mortsel (BE)

(72) Inventor: Johan Loccufier, Mortsel (BE)

(73) Assignee: AGFA NV, Mortsel (BE)

( * ) Notice: Subject to any disclaimer, the term of this patent is extended or adjusted under 35 U.S.C. 154(b) by 362 days.

(21) Appl. No.: 15/536,742

(22) PCT Filed: Dec. 14, 2015

(86) PCT No.: PCT/EP2015/079585
§ 371 (c)(1),
(2) Date: Jun. 16, 2017

(87) PCT Pub. No.: WO2016/096719
PCT Pub. Date: Jun. 16, 2016

(65) Prior Publication Data
US 2017/0355858 A1    Dec. 14, 2017

(30) Foreign Application Priority Data

Dec. 18, 2014 (EP) .................... 14198764

(51) Int. Cl.
*C09D 4/06* (2006.01)
*B32B 17/10* (2006.01)
(Continued)

(52) U.S. Cl.
CPC .......... *C09D 4/06* (2013.01); *B32B 17/10036* (2013.01); *B32B 17/10348* (2013.01);
(Continued)

(58) Field of Classification Search
CPC ........ C09D 4/06; C09D 11/101; C09D 11/30; B32B 17/10036; B32B 17/10348;
(Continued)

(56) References Cited

U.S. PATENT DOCUMENTS

| 4,088,801 A | 5/1978 | Bolon et al. |
| 5,882,370 A | 3/1999 | Garner et al. |

(Continued)

FOREIGN PATENT DOCUMENTS

| EP | 0 360 014 A1 | 3/1990 |
| EP | 0 363 790 A2 | 4/1990 |

(Continued)

OTHER PUBLICATIONS

Official Communication issued in International Patent Application No. PCT/EP2015/079585, dated Feb. 18, 2016.
(Continued)

*Primary Examiner* — Robert S Walters, Jr.
(74) *Attorney, Agent, or Firm* — Stinson LLP (57) ABSTRACT

A radiation curable composition including at least one organic silver salt, at least one reducing agent for the organic silver salt, and a polymerizable composition of at least one polymerizable compound, wherein the radiation curable composition is a radiation curable inkjet ink containing at least 50 wt % of a monofunctional polymerizable compound based on the total weight of the polymerizable composition. The radiation curable composition is especially useful for generating black UV light blocking borders in laminated safety glass for automotive applications.

9 Claims, 4 Drawing Sheets (51) Int. Cl.
*B60J 1/02* (2006.01)
*C08F 216/38* (2006.01)
*C08F 220/18* (2006.01)
*C09D 11/101* (2014.01)
*C09D 11/30* (2014.01)
*C03C 25/38* (2006.01)
*C03C 25/62* (2018.01)

(52) U.S. Cl.
CPC ............ *B32B 17/10935* (2013.01); *B60J 1/02* (2013.01); *C03C 25/38* (2013.01); *C03C 25/62* (2013.01); *C08F 216/38* (2013.01); *C08F 220/18* (2013.01); *C09D 11/101* (2013.01); *C09D 11/30* (2013.01)

(58) Field of Classification Search
CPC ...... B32B 17/10935; B60J 1/02; C03C 25/38; C03C 25/62; C08F 216/38; C08F 220/18
See application file for complete search history.

(56) References Cited

U.S. PATENT DOCUMENTS

2008/0206504 A1 8/2008 Hayes et al.
2008/0280076 A1 11/2008 Hayes et al.

FOREIGN PATENT DOCUMENTS

| EP | 1 369 439 A1 | 12/2003 | |
|----|--------------|---------|---|
| EP | 1 384 731 A1 | 1/2004 | |
| EP | 2 368 859 A1 | 9/2011 | |
| GB | 1 380 808 A | 1/1975 | |
| WO | WO-2005014074 A1 * | 2/2005 | ........... A61L 12/088 |

OTHER PUBLICATIONS

"Database WPI", Thomson Scientific, AN 2009-H35401, XP-002739683, Apr. 23, 2009, 2 pages.

* cited by examiner

RADIATION CURABLE COMPOSITIONS

CROSS REFERENCE TO RELATED APPLICATIONS

This application is a 371 National Stage Application of PCT/EP2015/079585, filed Dec. 14, 2015. This application claims the benefit of priority to European Application No. 14198764.4, filed Dec. 18, 2014, which is incorporated by reference herein in its entirety.

BACKGROUND OF THE INVENTION

1. Field of the Invention

The present invention relates to a radiation curable composition for generating a black colour after radiation curing by UV light. This is especially useful for generating black UV light blocking borders in laminated safety glass for automotive applications.

2. Description of the Related Art

Figure 1:
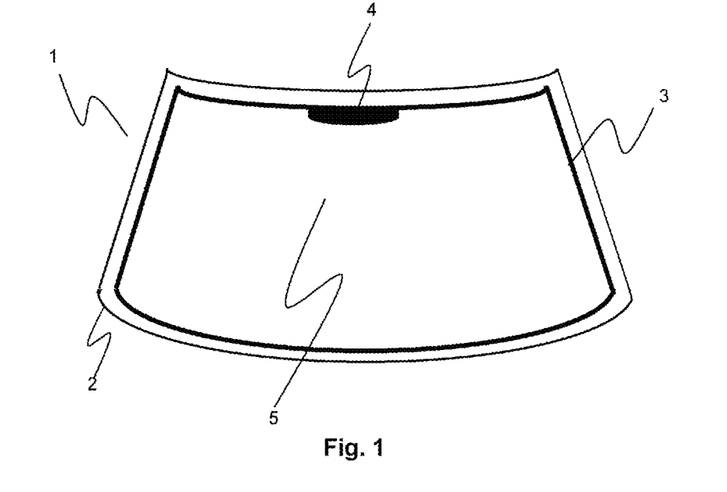
FIG. 1 shows a top view of a windshield 1 wherein a laminated glass 2 has a UV light blocking border 3 prepared from an enamel ink printed thereon around a central part of the windshield 5. A broader area 4 is applied for protecting the adhesive of the rear-view mirror inside the vehicle.
Figure 2:
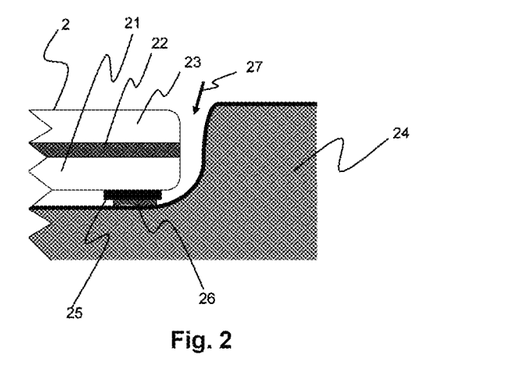
FIG. 2 shows a cross section of a windshield according to FIG. 1 glued with an adhesive 26 into a vehicle frame 24. The laminated glass 2 consists of an interlayer 22 between an outer glass layer 23 and an inner glass layer 21, having an enamel UV light blocking border 25. The arrow shows the acid rain penetration 27 which degrades the adhesive 26 over time.

Laminated safety glass is glass that holds together by an interlayer between two or more layers of glass when shattered. This safety glass is typically used as a windshield for the front window of a vehicle. These windshields are usually glued into the vehicle frame by an adhesive, which necessitates protective measures against degradation of the adhesive over time, e.g. by UV light or acid rain. For the latter, a rubber seal (28 in FIG. 3) is often used to prevent moisture from reaching the adhesive. Protection against UV light is obtained by a UV light blocking border (3 in FIG. 1), which usually has a black colour.

In state-of-the-art manufacturing processes (see FIG. 4) of automotive laminated safety glass, the black UV light blocking border is applied by screen printing an enamel ink on a flat windshield shaped glass layer 42 before gravity-sag shaping in a long tunnel oven or furnace 35. In this furnace, temperatures above 600° C. are used to bend the glass layer under its own weight and simultaneously also fire the enamel ink which generally consists of 50 to 85 wt % of low melting glass frit fluxes, 10 to 40 wt % of inorganic pigments and other additive oxides, sulphides or metals. Pigments often used for black colour development include copper chromite spinel $CuCr_2O_4$ and chrome iron nickel spinel $(Ni,Fe)(Cr,Fe)_2O_4$. Typical enamels are disclosed by, for example, EP 2368859 A (FERRO CORP). Sag bending is performed by shaping the glass layers as matched pairs, in order to avoid later lamination problems in the autoclave 39.

In automobile design, improved aerodynamics and visibility require more glass surface area with more complex shapes. For this reason press bend technology or pressure forming technology was developed allowing precise shape control and faster production rates. An apparatus for press bending glass layers is disclosed in e.g. U.S. Pat. No. 5,882,370 (PILKINGTON GLASS).

During the lifetime of a vehicle, there is a reasonable chance that the windshield has to be replaced at least once. As there are many different designs developed over a large period of time, manufacturing of replacement windshields almost automatically leads to short run productions, making the standard manufacturing method, using screen printing, very expensive. Therefore, it is highly desirable to develop production methods, using digital printing techniques to avoid expensive and time consuming prepress operations.

It was found that printing the UV light blocking border with an inkjet ink, e.g. a solvent or UV curable black inkjet ink containing carbon black, not only caused adhesion problems but also failed to reach the desired opacity for effective UV protection of an adhesive with which the laminated safety glass is glued into a vehicle frame. One way to address the adhesion problems is by an additional coating of an adhesion promoter as in US 2008206504 (DUPONT). However incorporation of this coating process makes the manufacturing process more complex, for example, for handling the various shapes of laminated safety glass.

UV curable technology is one of the most preferred technologies in an industrial production environment. It allows high printing speeds to match the required production throughput without the drawbacks of handling the solvent evaporation hazards for solvent based formulations or the high drying capacity and corresponding energy input for water based formulations.

However, designing UV curable compositions having UV blocking properties is a fundamental problem as the UV blocking functionality needed for UV protection of the adhesive does no longer allow UV curing at a reasonable curing speed due to the optical interference with the photoinitiating systems.

EP 0360014 A (CANON) discloses a photosensitive material, comprising a photosensitive silver halide, an organic silver salt, a reducing agent, a polymerizable polymer precursor, a photopolymerization initiator and a heat-diffusible coloring matter.

EP 0363790 A (CANON) discloses an image forming method comprising; subjecting an image forming medium containing at least a photosensitive silver halide, an organic silver salt, a reducing agent, a polymerizable polymer precursor and a photopolymerization initiator, to imagewise exposure, followed by heating to produce a light-absorbing organic compound in the image forming medium; and subjecting the image forming medium in which the light-absorbing organic compound has been produced, to polymerization exposure to cause the polymerizable polymer precursor to polymerize; where the light-absorption characteristics of the light-absorbing organic compound are utilized to suppress the polymerization of the polymerizable polymer precursor at the area at which the light-absorbing organic compound has been produced.

EP 1384731 A (KURARAY) discloses an interlayer film for laminated glass comprising a polyvinyl acetal having a degree of acetalization of from 45 to 80 mol %, which is obtained through acetalization of a polyvinyl alcohol that contains from 1 to 15 mol % of α-olefin units and has a 1,2-glycol bond content of from 1 to 3 mol %, a degree of polymerization of from 100 to 2000 and a degree of hydrolysis of from 80.0 to 99.99 mol %.

US 2008280076 A (HAYES) discloses decorative safety glass comprising an interlayer bearing an image wherein the interlayer is an acoustic poly(vinyl acetal) interlayer having a Tg of 23° C. or less.

Therefore, there is a need for radiation curable compositions allowing high curing speed, while maintaining the capability of generating UV blocking properties for manufacturing laminated safety glass for car windshields.

SUMMARY OF THE INVENTION

In order to overcome the problems described above, preferred embodiments of the present invention provide a radiation curable composition as defined below.

The radiation curable composition allows for a simple manufacturing process by generating the black UV blocking borders for laminated safety glass upon thermal treatment after the radiation curing of the printed or coated radiation curable composition.

Figure 3:
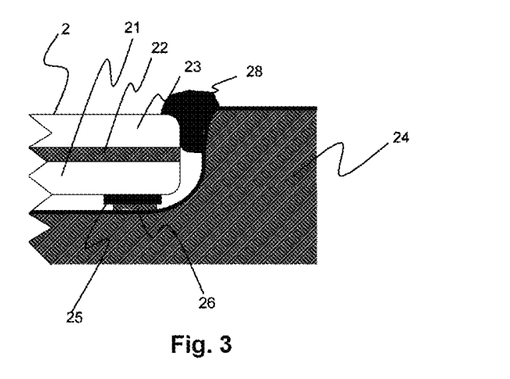
FIG. 3 is identical to FIG. 2 except that the acid rain penetration 27 in FIG. 2 is prevented by a rubber seal 28.
Figure 5:
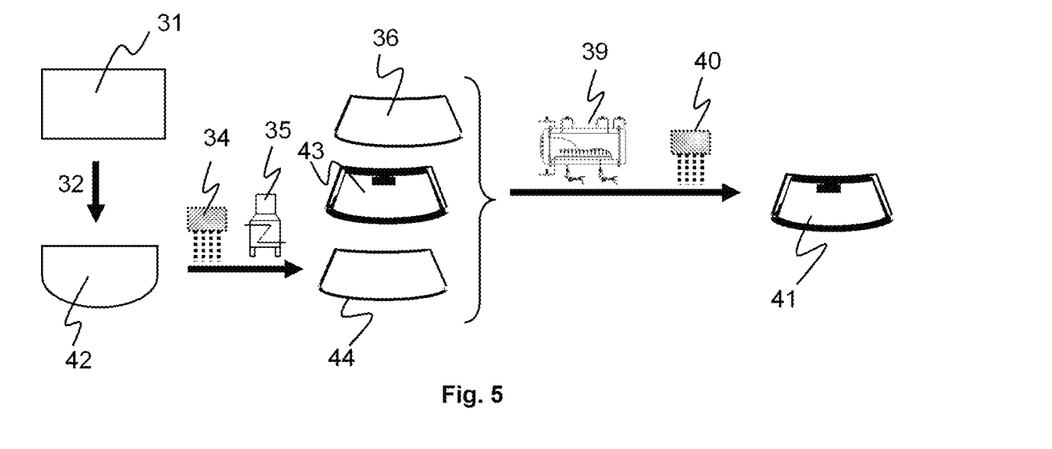
Figure 6:
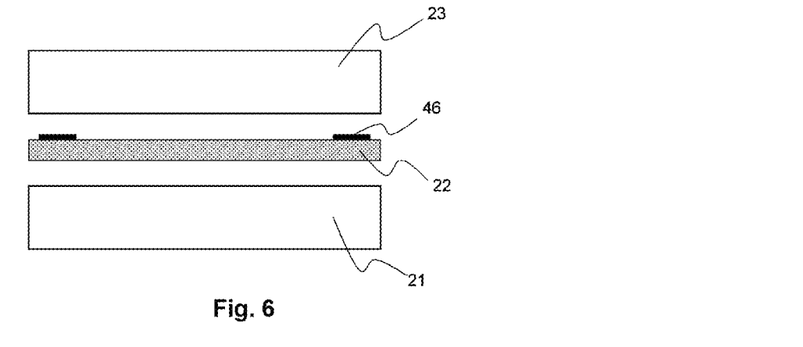
FIG. 6 is a cross section representation of an assembly of an outer glass layer 23, an interlayer 22 having a radiation curable composition 46 on its surface and an inner glass layer 21.
Figure 7:
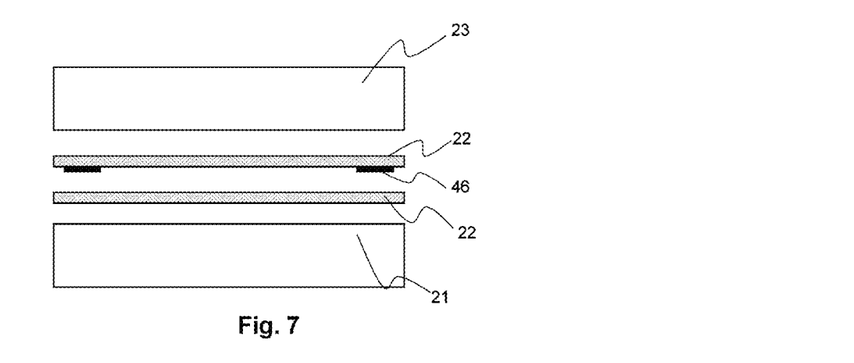
FIG. 7 is a cross section representation of an assembly of an outer glass layer 23, a first interlayer 22 having a radiation curable composition 46 on its surface, a second interlayer 22 and an inner glass layer 21.
Figure 8:
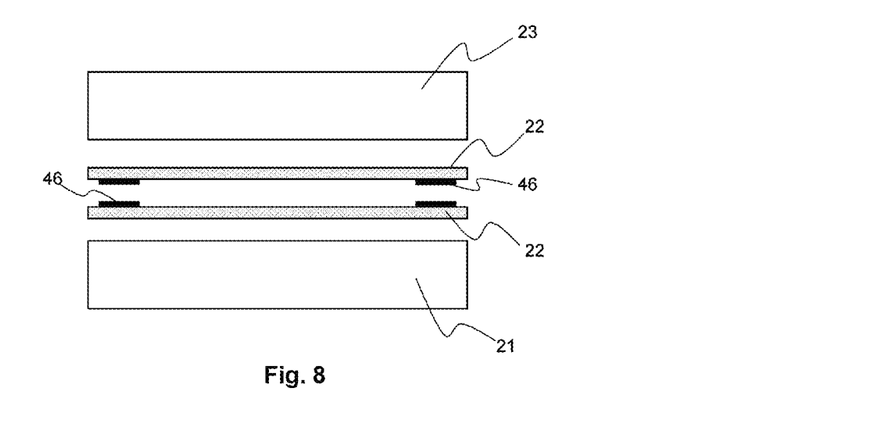
FIG. 8 is a cross section representation of an assembly of an outer glass layer 23, two interlayers 22 each having a radiation curable composition 46 on its surface and an inner glass layer 21.
Figure 9:
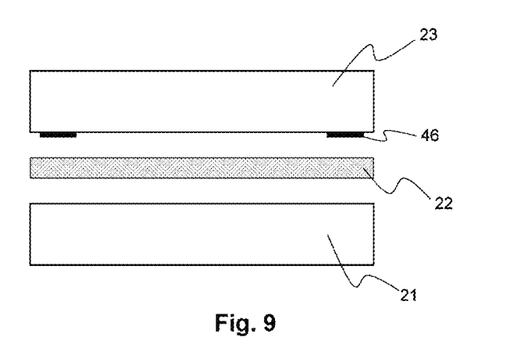
FIG. 9 is a cross section representation of an assembly of an outer glass layer 23 having a radiation curable composition 46 on its inner surface, an interlayer 22 and an inner glass layer 21.
Figure 10:
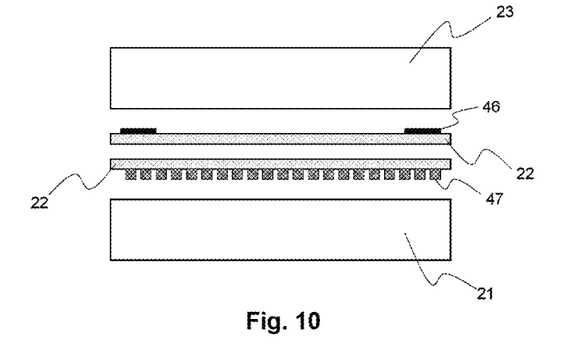
FIG. 10 is a cross section representation of an assembly of an outer glass layer 23, a first interlayer 22 having a radiation curable composition 46 on its surface, a second interlayer 22 having a functional conductive pattern 47 on its surface and an inner glass layer 21.

Another advantage is that, contrary to the state-of-the-art laminated safety glass using an enamel UV light blocking border (25) as in FIG. 3, is that the UV light blocking borders and areas are now located between the inner and outer glass layers (36, 44) in FIG. 5 which prevents scratching or abrasion of the UV light blocking border during the manufacturing process of laminated safety glass and thereafter.

Further objects of the invention will become apparent from the description hereinafter.

BRIEF DESCRIPTION OF THE DRAWINGS

FIG. 4 is a schematic representation of a state-of-the-art manufacturing process for automotive laminated safety glass. Raw glass 31 is marked up and cut 32 into a flat windshield shaped glass layer 42, which is then cleaned 34 and printed with an enamel ink 45 to result in an enamel ink printed inner glass layer 33. The latter undergoes bending in a furnace 35 to produce a bent enamel ink printed inner glass layer 38. Under vacuum an assembly is made of a bent outer glass layer 36, an interlayer 37, and the bent enamel ink printed inner glass layer 38, which is then fused together in an autoclave 39. A ready-to-use windshield 41 is obtained after a cleaning step 40.

FIG. 5 is a schematic representation of a simplified manufacturing process for automotive laminated safety glass in accordance with the present invention. Raw glass 31 is marked up and cut 32 into a flat windshield shaped glass layer 42, which is then cleaned 34 and bent in a furnace 35 into an unprinted inner glass layer 44. Under vacuum an assembly is made of a bent outer glass layer 36, a printed interlayer 43 printed with the radiation curable composition, and a bent unprinted inner glass layer 44, which is then fused together in an autoclave 39. A ready-to-use windshield 41 is obtained after a cleaning step 40.

DETAILED DESCRIPTION OF THE PREFERRED EMBODIMENTS

Definitions

The term "actinic radiation" as used in disclosing the present invention, means electromagnetic radiation capable of initiating a chemical reaction, such as a polymerization reaction.

A "thermoplastic polymer sheet" is a polymer sheet that becomes pliable or mouldable above a specific temperature, and returns to a solid state upon cooling.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —$NO_2$.

Radiation Curable Compositions

A radiation curable composition according to the invention includes at least one organic silver salt; at least one reducing agent for the organic silver salt, and at least one polymerizable compound.

In a preferred embodiment of the radiation curable composition, the at least one organic silver salt contains silver behenate.

In a preferred embodiment of the radiation curable composition, the at least one polymerizable compound includes a monomer comprising at least an acetal group or a ketal group.

In a preferred embodiment, the radiation curable composition contains a polyvinylacetal having an average molar mass Mw of less than 50,000 g/mol.

For inkjet printing, e.g. with piezoelectric print heads or valve jet print heads, the polyvinylacetal preferably has a number average molecular weight of less than 50,000 g/mol, more preferably less than 40,000 g/mol and most preferably less than 30,000 g/mol.

The radiation curable composition according to present invention is a radiation curable inkjet ink.

Polymerizable Compounds

The radiation curable composition contains at least one polymerizable compound. The radiation curable composition may be a cationically curable composition, but is preferably a free radical curable composition.

The free radical curable composition preferably includes at least one free radical polymerizable compound having at least one free radical polymerizable group selected from the group consisting of an acrylate group, a methacrylate group, an acrylamide group, a methacrylamide group, a styrene group, a maleate group, a fumarate group, an itaconate group, a vinyl ether group, a vinyl ester group, an allyl ether group and an allyl ester group.

In a further preferred embodiment, said polymerizable compound is selected from the group consisting of an acrylate and a methacrylate, an acrylate being particularly preferred.

The polymerizable compound may have one, two, three, four, five or more free radical polymerizable groups, preferably acrylate groups, In a preferred embodiment, the radiation curable composition according to the present invention comprises at least 50 wt %, more preferably at least 75 wt % and most preferably at least 90 wt % of a monofunctional polymerizable compound based on the total weight of the polymerizable composition. Such a radiation curable composition usually has a viscosity suitable for inkjet printing.

In a more preferred embodiment, the radiation curable composition according to the present invention preferably comprises at least 70 wt % of one or more monofunctional acrylates, where the homopolymers of said acrylates have a glass transition temperature of not more than 100° C., more preferably not more than 75° C. and most preferably not more than 60° C.

In a further preferred embodiment of the present invention, the monofunctional polymerizable compound comprises at least on ether function.

In the most preferred embodiment of the present invention, the ether function in the monofunctional polymerizable compound comprising at least one ether function is selected from the group consisting of an acetal and a ketal function, five or six membered cyclic acetals and ketals being particularly preferred. Another advantage of these monofunctional polymerizable compounds comprising at least one ether function is that they exhibit a high compatibility with a polyvinylacetal, such as polyvinyl butyral, advantageously used for dispersing the organic silver salt.

The radiation curable composition preferably contains at least one monofunctional (meth)acrylate including at least one five or six membered acetal ring, preferably at least one monofunctional acrylate including at least one five or six membered acetal ring. Hereinafter, the term acetal monomer is used to refer to these monofunctional (meth)acrylates including at least one five or six membered acetal ring.

In a preferred embodiment, the acetal monomer including at least one five membered acetal ring is represented by general Formula (III):

Formula (III)

wherein, R6 and R7 are selected from the group consisting of a hydrogen, an alkyl group, an alkenyl group, an alkynyl group, an aralkyl group, an alkaryl group and an aryl group; or R6 and R7 may represent the necessary atoms to form a five to seven membered ring.

Preferred examples of highly preferred monomers are acetal monomers as shown in Table 1 without being limited thereto.

TABLE 1

| | |
|---|---|
| M-1 |  |
| M-2 |  |
| M-3 |  |
| M-4 |  |

TABLE 1-continued

| | |
|---|---|
| M-5 |  |
| M-6 |  |
| M-7 |  |
| M-8 |  |
| M-9 |  |
| M-10 |  |

In a preferred embodiment, the acetal monomer including at least one six membered acetal ring is represented by Formula (II):

Formula (II)

wherein, R3 is selected from the group consisting of a hydrogen and an optionally substituted alkyl group including 1 to 8 carbon atoms; R4 and R5 are selected from the group consisting of a hydrogen, an alkyl group, an alkenyl group, an alkynyl group, an aralkyl group, an alkaryl group and an aryl group; or R4 and R5 may represent the necessary atoms to form a five to seven membered ring.

Polymerization Initiation

The radiation curable composition is cured by actinic radiation. The actinic radiation curing may be selected from the group consisting of UV curing, thermal curing and electron beam curing, but preferably the curing is performed by UV curing. The latter allows having maximum control on the curing process. For example, UV curing can be exploited in inkjet printing for enhancing the image quality by having UV LEDs travel along with the inkjet print head over the substrate to be printed and pin curing the jetted radiation curable composition.

The advantage of electron beam curing is that no initiator is required to be present in the radiation curable composition. However, the curing equipment can be quite large and expensive.

In thermal curing, preferably a thermal initiator is used in combination with an infrared dye in the radiation curable composition. The radiation curable composition is then cured by infrared light from an infrared light source such as infrared LEDs or infrared lasers.

In a more preferred embodiment, the radiation curable composition comprises at least one photoinitiator, more preferably a free radical photoinitiator, more specifically a Norrish type I photoinitiator or a Norrish type II photoinitiator. A free radical photoinitiator is a chemical compound that initiates polymerization of polymerizable compound when exposed to actinic radiation by the formation of a free radical. A Norrish Type I photoinitiator is an initiator which cleaves after excitation, yielding the initiating radical immediately. A Norrish type II-photoinitiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination. A photoinitiating system consists of one or more photoinitiators and optionally one or more co-initiators.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Preferred examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

The radiation curable composition may comprise at least one co-initiator. Examples of preferred co-initiators can be categorized in three groups: (a) tertiary aliphatic amines such as methyldiethanolamine, dimethylethanolamine, triethanolamine, triethylamine and N-methylmorpholine; (b) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and (c) (meth)acrylated amines such as dialkylamino alkyl(meth)acrylates (e.g., diethylaminoethylacrylate) or N-morpholinoalkyl-(meth)acrylates (e.g., N-morpholinoethylacrylate). Particularly preferred co-initiators are aminobenzoates.

Organic Silver Salts

The organic silver salt is the source for generating silver metal upon thermal treatment. Silver being a noble metal is very resistant to corrosion and oxidation in moist air, which can be exploited advantageously in glass manufacturing processes.

The term organic silver salt for the purposes of the present invention also includes mixtures of organic silver salts.

Suitable organic silver salts include silver salts of organic compounds having a carboxylic acid group. Examples thereof include a silver salt of an aliphatic carboxylic acid or a silver salt of an aromatic carboxylic acid.

Preferred examples of the silver salts of aliphatic carboxylic acids include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof.

The organic silver salt is preferably the silver salt of a long-chain carboxylic acid, preferably the chain contains 10 to 30 carbon atoms, more preferably 15 to 28 carbon atoms. In a particularly preferred embodiment, at least silver behenate is used either alone or in mixtures with other silver carboxylates. Most preferably the organic silver salt consists for 40 to 100 wt % out of silver behenate based on the total weight of the organic silver salt. The advantage of using silver behenate is that, upon conversion of silver behenate to silver metal by thermal treatment, behenic acid is formed which has a relatively high melting point of 80° C.

After thermal conversion of the silver organic salt to silver, the organic acid remains as the other reaction product between the inner and outer glass layers of the laminated safety glass. Upon a hot day, the organic acid between the inner and outer glass layers of a car windshield could melt and thereby reduce the strength of the windshield or cause adhesion problems of the interlayer to a glass layer. The organic silver salt is therefore preferably made from an organic acid having a melting point above 60° C., more preferably above 70° C.

The preparation of an organic silver salt is well-known to the skilled person in the art. Usually the organic acid is first converted by a base such as NaOH to an organic sodium salt, whereafter the organic sodium salt is substantially or fully converted to an organic silver salt by addition of $AgNO_3$.

The total amount of silver organic salt applied in manufacturing laminated safety glass is preferably in the range of 0.010 to 0.040 mol/m². With an amount of less than 0.010 mol/m² insufficient optical density is obtained, while the extra optical density versus additional cost is minimal above 0.040 mol/m².

Polymeric Dispersing Agents

The organic silver salt is preferably dispersed in the radiation curable composition according to the invention by a polymeric dispersing agent.

The weight ratio of the polymeric dispersing agent to the organic silver salt is preferably in the range of 0.2 to 7.

Any polymeric dispersing agent known in the art can be used to disperse the organic silver salt. The polymeric dispersing agent is preferably a polyvinylacetal or copolymer thereof, more preferably polyvinyl butyral or copolymers thereof. Polyvinylacetal and certainly polyvinyl butyral have as dispersing agent no negative effect on the adhesion to glass, usually they even improve the adhesion.

Suitable polyvinylacetal polymers are available as Mowital™ and Poiloform™ grades from Kuraray. Pioloform™ BN18, B16H, BL16 and B20H are particularly preferred as polyvinyl butyral, since they all have an average molar mass Mw of less than 50,000 g/mol. Other suitable commercial polyvinylacetal polymers are available as S-Lec™ B and K grades from Sekisui. A preferred polyvinyl butyral is S-Lec™ BL10 having an average molar mass Mw of about 15,000 g/mol.

The average molar mass Mw of the polymeric dispersing agent is preferably no more than 100,000 g/mol for easy handling of the radiation curable composition. An average molar mass Mw higher than 100,000 g/mol tends to give very viscous radiation curable compositions.

For inkjet printing, e.g. with piezoelectric print heads or valve jet print heads, the polymeric dispersing agent preferably has an average molar mass Mw of less than 50,000 g/mol, more preferably less than 30,000 g/mol and most preferably less than 20,000 g/mol. For high resolution inkjet printing with piezoelectric print heads, the binder is preferably to a large degree extent absent, in order not to disturb jetting performance.

The number average molecular weight of the polyvinylacetal is preferably not more than 100,000, more preferably not more than 50,000 and most preferably not more than 25,000. A number average molecular weight no more than 100,000 allows for easy handling of the radiation curable composition, as a value of more than 100,000 tends to result in highly viscous radiation curable compositions. A number average molecular weight of not more than 50,000 makes the composition especially suitable for inkjet printing.

For inkjet printing, e.g. with piezoelectric print heads or valve jet print heads, the at least one acetal containing polymer is more preferably has a number average molecular weight of less than 50,000 g/mol, more preferably less than 30,000 g/mol and most preferably less than 20,000 g/mol.

Reducing Agents

The reducing agent for the organic silver salt is a compound or a set of compounds that can reduce the silver ion of the organic silver salt to its metallic form.

Suitable reducing agents include aromatic di- and trihydroxy compounds (such as hydroquinones, gallatic acid and gallic acid derivatives, catechols, and pyrogallols), aminophenols (for example, N-methylaminophenol), p-phenylenediamines, alkoxynaphthols (for example, 4-methoxy-1-naphthol), pyrazolidin-3-one type reducing agents (for example Phenidone™), pyrazolin-5-ones, polyhydroxy spiro-bisindanes, indan-1,3-dione derivatives, hydroxytetrone acids, hydroxytetronimides, hydroxylamine derivative, hydrazine derivatives, hindered phenols, amidoximes, azines, and reductones (for example, ascorbic acid and ascorbic acid derivatives).

When a silver benzotriazole salt is used, ascorbic acid reducing agents are preferred.

Suitable ascorbic acid developing agents include ascorbic acid and the analogues, isomers and derivatives thereof. Such compounds include, but are not limited to, D- or L-ascorbic acid, sugar-type derivatives thereof (such as sorboascorbic acid, [gamma]-lactoascorbic acid, 6-desoxy-L-ascorbic acid, L-rhamnoascorbic acid, imino-6-desoxy-L ascorbic acid, glucoascorbic acid, fucoascorbic acid, glucoheptoascorbic acid, maltoascorbic acid, L-arabosascorbic acid), sodium ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enamin-thiol type ascorbic acid.

The colour of the metallic silver formed by thermal treatment can to a certain degree be controlled by the kinetics of the reduction reaction. In the latter case weaker reducing agents, such as hindered phenol reducing agents, are predominantly used instead of the above strong reducing agents. In a preferred embodiment, the weaker reducing agents are used for reducing the organic silver salt in the presence of a silver halide.

Hindered phenol reducing agents are compounds that contain only one hydroxy group on a given phenyl ring and have at least one additional substituent located ortho to the hydroxy group. Hindered phenol reducing agents may contain more than one hydroxy group as long as each hydroxy group is located on different phenyl rings. Hindered phenol reducing agents include, for example, binaphthols (that is dihydroxybinaphthyls), biphenols (that is dihydroxybiphenyls), bis(hydroxynaphthyl)methanes, bis(hydroxyphenyl)methanes (that is bisphenols), hindered phenols, and hindered naphthols, each of which may be variously substituted.

Representative binaphthols include, but are not limited, to 1,1'-bi-2-naphthol, 1,1'-bi-4-methyl-2-naphthol and 6,6'-dibromo-bi-2-naphthol.

Representative biphenols include, but are not limited, to 2,2'-dihydroxy-3,3'-di-t-butyl-5,5-dimethylbiphenyl, 2,2'-dihydroxy-3,3',5,5'-tetra-t-butylbiphenyl, 2,2'-dihydroxy-3,3'-di-t-butyl-5,5'-dichlorobiphenyl, 2-(2-hydroxy-3-t-butyl-5-methylphenyl)-4-methyl-6-n-hexylphenol, 4,4'-dihydroxy-3,3',5,5'-tetra-t-butylbiphenyl and 4,4'-dihydroxy-3,3',5,5'-tetramethylbiphenyl.

Representative bis(hydroxynaphthyl)methanes include, but are not limited to, 4,4'-methylenebis(2-methyl-1-naphthol).

Representative bis(hydroxyphenyl)methanes include, but are not limited to, bis(2-hydroxy-3-t-butyl-5-methylphenyl)methane (CAO-5), 1,1'-bis(2-hydroxy-3,5-dimethylphenyl)-3,5,5-trimethylhexane (NONOX™ or PERMANAX™ WSO), 1,1'-bis(3,5-di-t-butyl-4-hydroxyphenyl)methane, 2,2'-bis(4-hydroxy-3-methylphenyl)propane, 4,4'-ethylidene-bis(2-t-butyl-6-methylphenol), 2,2'-isobutylidene-bis (4,6-dimethylphenol) (LOWINOX™ 221B46), and 2,2'-bis (3,5-dimethyl-4-hydroxyphenyl) propane.

Representative hindered phenols include, but are not limited to, 2,6-di-t-butylphenol, 2,6-di-t-butyl-4-methylphenol, 2,4-di-t-butylphenol, 2,6-dichlorophenol, 2,6-dimethylphenol and 2-t-butyl-6-methylphenol.

Representative hindered naphthols include, but are not limited to, 1-naphthol, 4-methyl-1-naphthol, 4-methoxy-1-naphthol, 4-chloro-1-naphthol and 2-methyl-1-naphthol.

Mixtures of hindered phenol reducing agents can be used if desired, or combinations with substituted hydrazines including sulfonyl hydrazides are also preferred.

Still another useful class of reducing agents are polyhydroxy spiro-bis-indane compounds. Examples include 3,3, 3',3'-tetramethyl-5,6,5',6'-tetrahydroxy-1,1'-spiro-bis-indane (called indane I) and 3,3,3',3'-tetramethyl-4,6,7,4',6',7'-hexahydroxy-1,1'-spiro-bis-indane (called indane II).

In the absence of a silver halide, the organic silver salt is preferably reduced by one or more reducing agent selected from the group consisting of catechol-type reducing agents, i.e. reducing agents containing at least one benzene nucleus with two hydroxy groups (—OH) in ortho-position.

Particularly preferred are: catechol, 3-(3,4-dihydroxyphenyl) propionic acid, 1,2-dihydroxybenzoic acid, gallic acid and esters e.g. methyl gallate, ethyl gallate, propyl gallate, tannic acid, and 3,4-dihydroxy-benzoic acid esters.

Particularly preferred catechol-type reducing agents are benzene compounds in which the benzene nucleus is substituted by no more than two hydroxy groups which are present in 3,4-position on said nucleus and have in the 1-position of said nucleus a substituent linked to said nucleus by means of a carbonyl group.

Particularly preferred reducing agents are 1,2-dihydroxybenzene derivatives, such as catechol, 3-(3,4-dihydroxyphenyl) propionic acid, 1,2-dihydroxybenzoic acid, gallic acid and esters e.g. methyl gallate, ethyl gallate, propyl gallate, ethyl 3,4-dihydroxybenzoate, n-butyl 3,4-dihydroxybenzoate, 3,4-dihydroxy-benzaldehyde, 3,4-dihydroxy-acetophenone, 3,4-butyrophenone, 3,4-dihydroxy-benzophenone, 3,4-dihydroxybenzophenone derivatives, 3,4-dihydroxybenzonitrile, and tannic acid.

The optical density depends on the coverage of the above defined reducing agent(s) and organic silver salt(s) and is preferably such that, on heating above 100° C., an optical density of at least 3.0 can be obtained. Preferably at least 0.10 moles of reducing agent per mole of organic silver salt is used.

Tone Modifying Agents

The colour of the metallic silver is usually brownish black, but can also be yellow, orange or brown depending on the reaction kinetics for the reduction of organic silver salt. As already discussed above, the choice of the reducing agent is one way to influence the silver colour. Usually it is desired for the silver to have a bluish black colour, so-called neutral black colour.

For obtaining a desired silver colour, a tone modifying agent is used. This tone modifying agent is preferably one or more compounds selected from: a) a silver halide; b) a colorant and c) a silver ion complexant.

The silver halide may be any type of silver halide such as silver bromide, silver iodide, silver chloride, silver bromoiodide, silver chlorobromoiodide, silver chlorobromide etc. The silver halide may be in any form which is photosensitive including, but not limited to, cubic, orthorhombic, tabular, tetrahedral, octagonal etc. and may have epitaxial growth of crystals thereon.

The silver halide may be employed without modification. However, it may be chemically sensitized with a chemical sensitizing agent such as a compound containing sulphur, selenium, tellurium etc., or a compound containing gold, platinum, palladium, iron, ruthenium, rhodium or iridium etc., a reducing agent such as a tin halide etc., or a combination thereof. The details of these procedures are described in T. H. James, "The Theory of the Photographic Process", Fourth Edition, Macmillan Publishing Co. Inc., New York (1977), Chapter 5, pages 149 to 169.

The silver halide may be prepared beforehand and then added to a radiation curable composition containing an organic silver salt.

Alternatively, a halide salt, preferably a bromide salt such as LiBr, NaBr, KBr and $NH_4Br$, can be added to radiation curable composition containing an organic silver salt. Because of the lower solubility product of silver halide versus the organic silver salt, part of the organic silver salt is then converted into silver halide.

The silver halide grains can vary in average diameter of up to several micrometers. However, preferred silver halide grains having an average particle size of from 0.01 to 0.5 μm, more preferably an average particle size from 0.01 to 0.15 μm. Within these ranges the colour can be influenced most effectively.

The silver halide is preferably be employed in a range of 0.25 to 25 mol percent and, preferably, from 2 to 20 mol percent of the organic silver salt. Within these ranges the colour can be influenced in a most cost-effective way.

Another way to influence the colour of the metallic silver formed by reduction is the addition of a colorant. The colorant preferably has an absorption maximum in the visual spectrum (400-700 nm) above 500 nm for accomplishing a neutral black colour.

The colorant in the radiation curable composition may be a pigment or a dye. Generally dyes exhibit a higher light fading than pigments, but cause no problems on jettability. It was found that anthraquinone dyes exhibit only minor light fading under the normal UV curing conditions used in UV curable inkjet printing.

In a preferred embodiment, the colorant is an anthraquinone dye, such as Macrolex™ Blue 3R (CASRN 325781-98-4) from LANXESS. Other preferred dyes include crystal violet and a copper phthalocyanine dye. These dyes have a reasonable good light stability.

However for articles that are frequently exposed to sun light, the colorant is a colour pigment, preferably having an absorption maximum in the visual spectrum (400-700 nm) above 500 nm for accomplishing a neutral black colour.

Suitable colour pigment may be chosen from those disclosed by HERBST, Willy, et al. Industrial Organic Pigments, Production, Properties, Applications. 3rd edition. Wiley-VCH, 2004. ISBN 3527305769.

Preferred colour pigments are selected from the consisting of quinacridone pigments, diketopyrrolo pyrrole pigments (such as C.I. Pigment Red 254) and copper phthalocyanine pigments.

Most preferably the colour pigment includes at least a copper phthalocyanine, most preferably C.I Pigment Blue 15:3 or 15:4.

For inkjet printing, the colour pigment particles as well as the organic silver salt particles, should be sufficiently small to permit free flow of the radiation curable composition through the inkjet-printing device, especially at the ejecting nozzles. It is also desirable to use small particles for maximum colour strength and to slow down sedimentation. Most preferably, the average pigment particle size is no larger than 150 nm. The average particle size of pigment particles is preferably determined with a Brookhaven Instruments Particle Sizer BI90plus based upon the principle of dynamic light scattering.

In a preferred embodiment, the colorant is present in an amount of 0.1 to 6.0 wt %, more preferably 0.3 to 1.5 wt %, based on the total weight of the radiation curable composition.

Another way for obtaining a desired silver colour is the addition of a silver ion complexant. These compounds interfere directly in the reaction kinetics of the reduction of the organic silver salt, since the reducing agent reacts with a silver ion complex instead of directly with the organic silver salt. A single silver ion complexant or a combination thereof may be used. Often a synergetic effect is observed for obtaining a neutral black colour by using a combination of two silver ion complexants especially when at least one of the silver ion complexants is selected from the group consisting of benzoxazine dione, benzoxazine dione derivatives, phthalazinone, phthalazinone derivatives, pyridazone and pyridazone derivatives. We believe that by using these silver ion complexants that the different diffusion coefficient of the silver ion complex in the organic acid melt is such that a neutral black colour is obtained by silver nanoparticle aggregation.

Preferred silver ion complexants include, but are not limited to, phthalimide and N-hydroxyphthalimide, cyclic imides (such as succinimide), pyrazoline-5-ones, quinazolinone, 1-phenylurazole, 3-phenyl-2-pyrazoline-5-one, and 2,4-thiazolidinedione, naphthalimides (such as N-hydroxy-1,8-naphthalimide), cobalt complexes [such as hexaaminecobalt(3+) trifluoroacetate], mercaptans (such as 3-mercapto-1,2,4-triazole, 2,4-dimercaptopyrimidine, 3-mercapto-4,5-diphenyl-1,2,4-triazole and 2,5-dimercapto-1,3,4-thiadiazole), N-(aminomethyl)aryldicarboximides (such as (N,N-dimethylaminomethyl)phthalimide), and N-(dimethylaminomethyl)naphthalene-2,3-dicarboximide, a combination of blocked pyrazoles, isothiuronium derivatives, merocyanine dyes {such as 3-ethyl-5-[(3-ethyl-2-benzothiazolinylidene)-1-methyl-ethylidene]-2-thio-2,4-o-azolidinedione}, phthalazinone and phthalazinone derivatives, or metal salts or these derivatives [such as 4-(1-naphthyl) phthalazinone, 6-chlorophthalazinone, 5,7-dimethoxyphthalazinone, and 2,3-dihydro-1,4-phthalazinedione], a combination of phthalazine (or derivative thereof) and one or more phthalic acid derivatives (such as phthalic acid, 4-methylphthalic acid, 4-nitrophthalic acid, and tetrachlorophthalic anhydride), quinazolinediones, benzoxazine or naphthoxazine derivatives, benzoxazine-2,4-diones and naphthoxazine diones (such as 1,3-benzoxazine-2,4-dione, 8-methyl-1,3-benzoxazine-2,4-dione, 3,4-dihydro-2,4-dioxo-1,3,2H-benzoxazine, 3,4-dihydro-2,4-dioxo-1,3,7-ethylcarbonatobenzoxazine, and 6-nitro-1,3-benzoxazine-2,4-dione), pyrimidines and asym-triazines (such as 2,4-dihydroxypyrimidine, 2-hydroxy-4-aminopyrimidine and azauracil) and tetraazapentalene derivatives [such as 3,6-dimercapto-1,4-diphenyl-1H,4H-2,3a,5,6atetraazapentalene and 1,4-di-(o-chlorophenyl)-3,6-dimercapto-1H,4H-2,3a,5,6a-tetraazapentalene]. Preferred tone modifying agents are selected from the group consisting of succinimides, phthalimides, phthalazinones, combinations of phtalazines and one or more phthalic acid derivatives, pyridazones, benzoxazine diones and naphthoxazine diones.

Stabilizers

The radiation curable composition may further contain a stabilizer, for example, to enhance the shelf life stability of the radiation curable composition.

Preferred stabilizers having primarily a stabilizing effect of the organic silver salt are selected from the group consisting of benzotriazole; substituted benzotriazoles; aromatic polycarboxylic acid, such as ortho-phthalic acid, 3-nitrophthalic acid, tetrachlorophthalic acid, glutaric acid, mellitic acid, pyromellitic acid and trimellitic acid and anhydrides thereof; 1-phenyl-5-mercaptotetrazole compounds in which the phenyl group is substituted with a substituent containing an optionally substituted aryl group, 1-(5-mercapto-1-tetrazolyl)-acetyl compounds.

The radiation curable composition preferably also contains a polymerization inhibitor as stabilizer. Suitable polymerization inhibitors include phenol type antioxidants, hindered amine light stabilizers, phosphor type antioxidants, hydroquinone monomethyl ether commonly used in (meth) acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % based on the total weight of the radiation curable composition.

Surfactants

The radiation curable composition may also contain one or more surfactants for controlling the spreading of the radiation curable composition on glass or another substrate.

Especially in inkjet printing it is desirable to include at least one surfactant for controlling the dot size of a jetted droplet of the radiation curable composition. The jettable radiation curable composition must meet stringent performance criteria, especially for piezoelectric print heads, in order to be adequately jettable with high precision, reliability and during an extended period of time. To achieve both wetting of the substrate and high jetting performance, the surface tension of the ink is reduced by the addition of one or more surfactants.

The surfactant(s) can be anionic, cationic, non-ionic, or zwitter-ionic and are usually added in a total quantity less than 10 wt % based on the total weight of the radiation curable composition and particularly in a total less than 2 wt % based on the total weight of the radiation curable composition.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyester modified, polyether modified hydroxy functional, amine modified, epoxy modified and other modifications or combinations thereof. Preferred siloxanes are polymeric, for example polydimethylsiloxanes.

The fluorinated or silicone compound used as a surfactant may be a cross-linkable surfactant. Suitable copolymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Silicone surfactants are often preferred in curable inkjet inks, especially the reactive silicone surfactants, which are able to be polymerized together with the polymerizable compounds during the curing step.

Examples of useful commercial silicone surfactants are those supplied by BYK CHEMIE GMBH (including Byk™-302, 307, 310, 331, 333, 341, 345, 346, 347, 348, UV3500, UV3510 and UV3530), those supplied by TEGO CHEMIE SERVICE (including Tego Rad™ 2100, 2200N, 2250, 2300, 2500, 2600 and 2700), Ebecryl™ 1360 a polysilixone hexaacrylate from CYTEC INDUSTRIES BV and Efka™-3000 series (including Efka™-3232 and Efka™-3883) from EFKA CHEMICALS B.V.

Articles

The radiation curable composition can be advantageously used in many articles, especially articles containing a glass layer due to the good adhesion properties of the radiation curable composition to a glass surface.

An article preferably contains a support for a cured layer of the radiation curable composition, wherein at least part of the organic silver salt in the cured layer is converted to silver metal.

The support is preferably selected from the group consisting of a glass layer and a thermoplastic polymeric layer.

In a preferred embodiment, the cured layer is located between two glass layers forming a laminated safety glass. The laminated safety glass preferably includes at least one item between the two glass layers selected from a vehicle identification number, a decorative element and a conductive pattern.

A laminated safety glass according to a preferred embodiment of the present invention includes at least, in order, an inner glass layer, an interlayer and an outer glass layer, wherein the interlayer is in contact with silver and organic acid both derived from thermally reducing the organic silver salt. In some embodiments, one of the glass layers, preferably an inner glass layer 21 may be replaced by a polycarbonate or polymethacrylate sheet. However, preferably the interlayer has on both sides at least one glass layer.

The laminated safety glass preferably includes at least one interlayer between at least two glass layers, but a plurality of interlayers or more than two glass layers may also be used. For example, this may be the case for aircraft windows in order to improve the strength thereof.

It may also be advantageous during safety glass manufacturing for logistic reasons to use one interlayer for the UV light blocking border and to use a second interlayer carrying a conductive pattern, e.g. an antenna or a heating wire pattern for defogging or defrosting.

Alternatively, according to a preferred embodiment, one interlayer may be used wherein the silver UV light blocking border is physically separated by the interlayer from a conductive pattern, meaning that the UV light blocking border is located on one side of the interlayer and that the conductive pattern is located on the opposite side of the interlayer. The conductive pattern is preferably selected from the group consisting of a defrosting heating wire pattern and an antenna.

The UV light blocking layer and areas preferably have an optical density of at least 3.0, more preferably at least 3.5 and most preferably at least 4.0.

The term "glass" is meant to include not only window glass, plate glass, silicate glass, sheet glass, low iron glass, and float glass, but also includes coloured glass, specialty glass which includes ingredients to control, for example, solar heating, coated glass with, for example, sputtered metals, such as silver or indium tin oxide, for solar control purposes, E-glass, Toroglass, Solex™ glass and the like. Such specialty glasses are disclosed in, for example, U.S. Pat. No. 4,615,989 (SCHOTT GLASWERKE), U.S. Pat. No. 5,173,212 (SCHOTT GLASWERKE), U.S. Pat. No. 5,264,286 (ASAHI GLASS), U.S. Pat. No. 6,150,028 (SAINT GOBAIN), U.S. Pat. No. 6,340,646 (NIPPON SHEET GLASS), U.S. Pat. No. 6,461,736 (NIPPON SHEET GLASS) and U.S. Pat. No. 6,468,934 (NIPPON SHEET GLASS). The glass may also include frosted or etched glass sheet. Frosted and etched glass sheets are articles of commerce and are well disclosed within the common art and literature. The type of glass to be selected for a particular laminate depends on the intended use.

The laminated safety glass can be advantageously used in a vehicle. When it is glued into the vehicle frame, the UV light blocking layer protects the adhesive against degradation by sun light (heat and UV light). In a preferred embodiment, the vehicle is selected from the group consisting of an aircraft, a car, a bus, a truck, a locomotive and a tram.

The laminated safety glass is not only useful for windshields in vehicles but can also be advantageously used, e.g. for personal security and reduction of theft, in the rear window and the side glazing of a vehicle and even in buildings to save energy or for solar control glazing or acoustic glazing.

Interlayers

The main function of an interlayer is to hold two or more layers of glass together even when shattered. The adhesion of the interlayer is usually tailored to the needs of the lamination process.

An interlayer is typically made with a relatively thick polymer film or sheet, which exhibits toughness and bondability to provide adhesion to the glass in the event of a crack or crash. Preferred polymeric interlayers possess a combination of characteristics including very high optical clarity, low haze, high impact resistance, high penetration resistance, excellent ultraviolet light resistance, good long term thermal stability, excellent adhesion to glass and other rigid polymeric sheets, low ultraviolet light transmittance, low moisture absorption, high moisture resistance, excellent long term weatherability, among other requirements.

A polymeric interlayer sheet preferably has a thickness between 0.25 mm and 6.40 mm to ensure adequate penetration resistance.

The polymeric sheet is preferably formed by extrusion.

The polymeric interlayer may have a smooth surface, but preferably has a roughened surface to effectively allow most of the air to be removed from between the surfaces of the assembly during the lamination process. This can be accomplished, for example, by mechanically embossing the sheet after extrusion or by melt fracture during extrusion of the sheet and the like.

Widely used interlayer materials utilized currently include complex, multicomponent compositions based on poly(vinyl acetal) (preferably polyvinyl butyral (PVB)), polyurethane (PU), polyvinylchloride (PVC), linear low density polyethylenes (preferably metallocene-catalyzed), poly(ethylene-co-vinyl acetate) (EVAc), polymeric fatty acid polyamides, polyester resins, such as poly(ethylene terephthalate), silicone elastomers, epoxy resins, elastomeric polycarbonates, ionomers (neutralized ethylene acid copolymer which comprises copolymerized residues of ethylene and copolymerized residues of α,β-unsaturated carboxylic acid) and the like.

In a preferred embodiment, the polymeric interlayer sheet is selected from the group consisting of poly(vinyl acetal) sheets and poly(ethylene-co-vinyl acetate) sheets. For reasons of compatibility with the radiation curable composition, an interlayer of polyvinyl butyral or an interlayer having at least a surface of polyvinyl butyral is preferred.

Suitable commercially available interlayer films include S-LEC™ interlayer films from SEKISUI, Butacite™ interlayers from DUPONT, Saflex™ and Vanceva™ interlayers from Eastman-Solutia, Trofisol™ interlayers from Kuraray and Winlite™ interlayers from Chang Chun Petrochemicals Ltd.

Suitable commercially available interlayer films including polyurethanes include Duraflex™ films from Bayer MaterialScience.

If conductive patterns or the like are to be incorporated into the safety glass, preferred interlayers include beside PVB, thermoplastic glass lamination materials today such as EVA (EthylVinylAcetate) and TPU (thermoplastic Polyurethane). The adhesion of PVB/TPU and EVA is not only high to glass but also to Polyester (PET) Interlayer. Since 2004 metallized and electroconductive PET Interlayers are used as substrate for light emitting diodes and laminated to or between glass. Such laminated safety glass may have a construction according to Table 2.

TABLE 2

| Top layer | Glass |
|---|---|
| Interlayer | Transparent thermoplastic material like TPU, PVB or EVA |
| Interlayer | LED (light emitting diodes) on transparent conductive Polymer |
| Interlayer | Transparent thermoplastic material like TPU, PVB or EVA |
| Bottom layer | Glass |

Other suitable laminated safety glass constructions include those disclosed on page 33 of WO 2008/141258 (DUPONT) and those adapted for a Head Up Display (HUD) system.

The interlayer may be a clear interlayer or may include a colorant to provide a uniformly coloured interlayer. For example, Butacite™ B51 and B52 grades from DUPONT can have an azure blue or a grey colour. Instead of uniform coloured interlayers, also a gradient tinted interlayer can be used. The latter can be used as automotive windshield tint bands to protect the driver's eyes from the sun glare.

The interlayer may include an adhesion promoter, such as an aminosilane. Preferred silane adhesion promoters are selected from the group consisting of vinyltriethoxysilane, vinyltrimethoxysilane, vinyltris(beta-methoxyethoxy)silane, gamma-methacryloxypropyltrimethoxysilane, beta-(3,4-epoxycyclohexyl)ethyltrimethoxysilane, gamma-glycidoxypropyltrimethoxysilane, gamma-glycidoxypropylmethyldiethoxysilane, vinyltriacetoxysilane, gamma-mercaptopropyltrimethoxysilane, (3-aminopropyl)trimethoxysilane, (3-aminopropyl)triethoxysilane, N-beta-(aminoethyl)-gamma-aminopropyltrimethoxysilane, N-(beta-aminoethyl)gamma-aminopropylmethyldimethoxysilane, aminoethylaminopropyl silane triol homopolymer, vinylbenzylaminoethylaminopropyltrimethoxysilane, bis(trimethoxysilylpropyl)amine, and mixtures thereof.

The interlayer may further include, for example, plasticizers, processing aides, flow enhancing additives, lubricants, pigments, dyes, flame retardants, impact modifiers, nucleating agents to increase crystallinity, anti-blocking agents such as silica, thermal stabilizers, ultraviolet (UV)

absorbers, antioxidants, UV stabilizers, thermal stabilizers, dispersants, surfactants, chelating agents, coupling agents, adhesives, primers and the like.

Methods for Manufacturing Laminated Safety Glass

A method of manufacturing an article according to a preferred embodiment of the present invention includes the steps of: a) applying a radiation curable composition as disclosed above; b) curing the applied radiation curable composition by actinic radiation; and c) converting at least part of the organic silver salt in the cured radiation curable composition to silver metal by a thermal treatment.

A method for manufacturing laminated safety glass according to a preferred embodiment of the invention includes the steps of: a) applying image wise a radiation curable composition including a organic silver salt on a surface selected from the group consisting of a glass surface and a thermoplastic polymeric surface; and b) heating at least the image wise applied radiation curable composition to form silver metal from the organic silver salt.

The thermoplastic polymeric surface may be the surface of the interlayer. This allows preparing interlayers printed with the desired UV light blocking borders and areas prior to their use in the assembly of the laminated glass. The printed UV light blocking borders and areas may even be thermally reduced on the interlayer prior to their use in the assembly of the laminated glass. Already thermally reduced printed UV light blocking borders and areas allow easier positioning between the inner and outer glass layers (36, 44).

Figure 4:
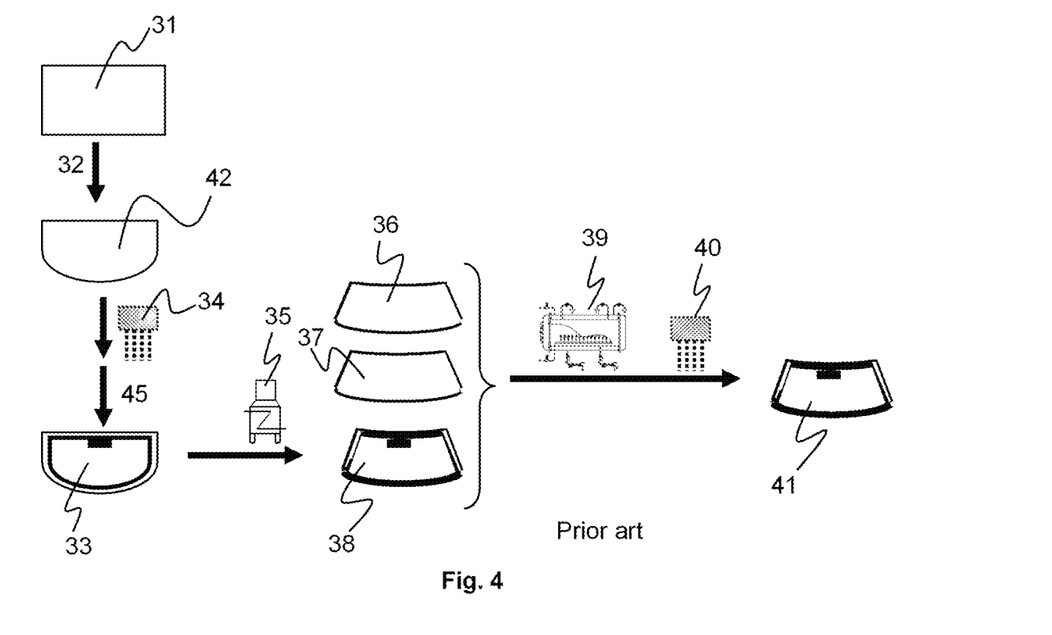

In an alternative embodiment of the manufacturing method, the heating step b) is performed during the lamination of an assembly of, in order, an inner glass layer, an interlayer and an outer glass layer, wherein the radiation curable composition is in contact with the interlayer having a thermoplastic polymeric surface. Such a heating step is usually performed in an autoclave 39 after applying a vacuum to remove air trapped between the glass layers. The heating step for thermal reduction is preferably performed at a temperature between 100° C. and 300° C., more preferably between 120° C. and 250° C., and most preferably between 130° C. and 180° C. The pressure in the autoclave is preferably between 150 psi (11.3 bar) and 250 psi (18.8 bar). The residence time in the autoclave is preferably from 10 to 50 minutes. The vacuum to remove air is preferably 689 to 711 mm Hg. For achieving this vacuum the assembly is often placed in a vacuum bag which may be sealed.

The laminated safety glass may also be produced through non-autoclave processes. Such non-autoclave processes are disclosed, for example, within U.S. Pat. No. 3,234,062 (PITTSBURGH PLATE GLASS), U.S. Pat. No. 3,852,136 (GLAVERBEL), U.S. Pat. No. 4,341,576 (PPG INDUSTRIES), U.S. Pat. No. 4,385,951 (PPG INDUSTRIES), U.S. Pat. No. 4,398,979 (PPG INDUSTRIES), U.S. Pat. No. 5,536,347 (MONSANTO), U.S. Pat. No. 5,853,516 (TAMGLASS), U.S. Pat. No. 6,342,116 (SAINT GOBAIN), U.S. Pat. No. 5,415,909 (SEKISUI CHEMICAL), US 2004182493 (CARDINAL LG COMPANY), EP 1235683 A (HUELS TROISDORF), WO 91/01880 A (MORTIMORE) and WO 03/057478 A (SOLUTIA). Generally, the non-autoclave processes include heating the assembly and the application of vacuum, pressure or both. For example, the assembly may be successively passed through heating ovens and nip rolls.

There is no real limitation for the technique used to apply the radiation curable composition. Preferred application techniques include screen printing, flexographic printing and inkjet printing, with the latter being most preferred as it allows variable printing, meaning that fast changes in the layout of the UV light blocking borders and areas are possible during manufacturing of laminated safety glass, e.g. for different models of a vehicle.

In one embodiment, the radiation curable composition is deposited on the glass surface of the inner glass layer or the outer glass layer making contact with the interlayer. In the latter case, the radiation curable composition includes preferably a thermoplastic polymer, such as polyvinyl butyral.

A vehicle identification number (VIN) is a unique code including a serial number, used by the automotive industry to identify individual motor vehicles, towed vehicles, motorcycles, scooters and mopeds as defined in ISO 3833. Today, the VIN code is engraved by using a stencil and an acidic etching paste onto the windshield and windows. As inkjet printing allows variable data printing, the VIN code can be printed in the method for manufacturing laminated safety glass. The advantage thereof is that, after the manufacturing of a windshield, the VIN code is located between the inner glass layer or the outer glass layer, making it inaccessible for tampering.

Inkjet Printing

Although there is no limitation to the application technique of the radiation curable composition, e.g. screen printing or flexographic printing may be used, a preferred application technique is inkjet printing.

The radiation curable composition may be jetted by one or more print heads ejecting small droplets in a controlled manner through nozzles onto a glass surface or a thermoplastic polymeric surface, which is moving relative to the print head(s).

A preferred print head for the inkjet printing system is a so-called valve jet print head, especially if the radiation curable composition includes a high amount of polymer, such as polyvinyl butyral. Preferred valve jet print heads have a nozzle diameter between 45 and 600 μm. This allows for a resolution of 15 to 150 dpi which is preferred for having high productivity while not comprising image quality.

The way to incorporate valve jet print heads into an inkjet printing device is well-known to the skilled person. For example, US 2012105522 (MATTHEWS RESOURCES INC)) discloses a valve jet printer including a solenoid coil and a plunger rod having a magnetically susceptible shank.

Valve jet print heads are commercially available, for example as Chromo Jet™ 200, 400 and 800 from Zimmer and Printos™ P16 from VideoJet.

In a preferred embodiment, the inkjet printing device includes one or more valve jet print heads.

The valve jet print head preferably jets droplets of 1 to 1500 nanoliter, which is much more than the picoliter droplets used jetted most piezoelectric inkjet printing systems. Another consequence is that higher viscosities of the radiation curable composition can be handled, for example, a substantial amount of a thermoplastic polymer like polyvinyl butyral can be included, contrary to e.g. piezo inkjet print heads.

The inkjet print head normally scans back and forth in a transversal direction across the moving glass surface or thermoplastic polymeric surface. Bi-directional printing, also called multi-pass printing, is preferred for obtaining a high areal throughput. Another preferred printing method is by a "single pass printing process", which can be performed by using page wide inkjet print heads or multiple staggered inkjet print heads which cover the entire width of the glass surface or thermoplastic polymeric surface.

In a preferred embodiment, the resolution of the print head is 15 to 150 dpi, preferably the resolution is no more than 75 dpi, more preferably no more than 50 dpi for maximizing printing speed and productivity. Valve jet print heads allowing variable dots or having multiple resolutions can also be advantageously used to enhance image quality further.

The throwing distance of the radiation curable composition droplets is preferably between 1 and 50 mm, more preferably between 3 and 30 mm for maximizing image quality.

If the radiation curable composition contains no or only a small amount of polymer, then preferably piezoelectric print heads are used. Piezoelectric inkjet printing is based on the movement of a piezoelectric ceramic transducer when a voltage is applied thereto. The application of a voltage changes the shape of the piezoelectric ceramic transducer in the print head creating a void, which is then filled with radiation curable composition. When the voltage is again removed, the ceramic expands to its original shape, ejecting a droplet of radiation curable composition from the print head. However the inkjet printing method according to the present invention is not restricted to piezoelectric inkjet printing. Other inkjet print heads can be used and include various types, such as a continuous type.

UV Curing Devices

The radiation curable composition according to the present invention may be cured by exposure to actinic radiation, preferably to ultraviolet radiation.

In inkjet printing, the curing means may be arranged in combination with the print head of the inkjet printer, travelling therewith so that the radiation curable composition is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All compounds and solvents were readily available from fine chemical suppliers such as ACROS or ALDRICH unless otherwise specified. The water used was demineralized water.

Pioloform™ BL16 is a poly(vinyl acetal-co-vinyl butyral) supplied by KURARAY.

SR 531 is a monofunctional acetal acrylate available as Sartomer™ SR531 from SARTOMER, having the structure:

Tone modifier 1 is 7-methyl-2H-1,3-benzoxazine-2,4 (3H)-dione, prepared according to GB 1160419 (ASPRO NICHOLAS LTD):

Tone modifier 1

Stabilizer 1 was obtained from Chemosyntha:

Stabilizer 1

Reductor 1 is 3,4-dihydroxy benzophenone, supplied by ACROS.

Stabilizer 2 is 1H-benzotriazole, supplied by ACROS.

IC819 is a bis(2,4,6-trimethylbenzoyl)-phenylphosphineoxide photoinitiator available as Irgacure™ 819 from BASF.

TPO-L is 2,4,6-trimethylbenzoyl phenylphosphinic acid ethyl ester available as Lucirin™ TPO-L from BASF.

ITX is 2-isopropyl-thioxanthone available as Speedcure™ ITX from Lambson.

EPD is ethyl 4-dimethylaminobenzoate, available under the trade name of Genocure™ EPD from RAHN AG.

Measurement Methods

1. Optical Density

The optical density was measured using a Macbeth TR924 densitometer.

2. Adhesion

The adhesion was tested using a knife which was positioned between the inner and outer glass layers of a laminated safety glass, whereby it was tried to separate the glass layers.

An evaluation was made in accordance with a criterion described in Table 3.

TABLE 3

| Score | Criterion |
| --- | --- |
| OK | No separation possible. The glass breaks. |
| Not OK | The inner and outer glass layers can be separated from each other |

3. Viscosity

The viscosity was measured using an AR G2 rheometer (TA instruments) at 20° C. and a shear stress of 10 Pa.

Example 1

This example illustrates a laminated safety glass manufactured with a radiation curable composition in accordance with the invention.

Preparation of Organic Silver Salt

Behenic acid was added to 800 mL of 2-butanone in a 5 L vessel and the dispersion heated with stirring at 350 rpm to 70° C. giving a clear solution. 1.1 L of 0.75M aqueous sodium hydroxide was added slowly until a pH of 9.9 was attained, then after 5 minutes further stirring 1 L of 0.8M aqueous silver nitrate was added at a constant rate of ca. 260 mL/h until a UAg (defined as the potential difference between a silver electrode of 99.99% purity in the aqueous liquid and a reference electrode consisting of a Ag/AgCl-electrode in 3M KCl solution at room temperature connected with the aqueous liquid via a salt bridge consisting of a 10% $KNO_3$ salt solution) of 315 mV was attained, thereby producing a 12% dispersion of organic silver salt. The organic silver salt was then filtered off and washed four times with deionized water with 2% of 2-propanol, after which it was dried for 72 hours at 45° C.

Preparation of Radiation Curable Compositions

A composition containing 42.5 g SR531, 5 g silver behenate and 2.5 g Pioloform™ BL16 was milled for 7 days, using 160 g of 3 mm yttrium stabilized zirconia beads. The obtained dispersion DISP-1 had a viscosity of 500 mPa·s.

A composition containing 44 g SR531, 5 g silver behenate and 1 g Pioloform™ BL16 was milled for 7 days, using 160 g of 3 mm yttrium stabilized zirconia beads. The obtained dispersion DISP-2 had a viscosity of 125 mPa·s.

The obtained dispersions DISP-1 and DISP-2 were used to formulate the radiation curable compositions INV-1 and INV-2 according to Table 4. All the weight percentages (wt %) are based of the total weight of the radiation curable composition INV-1 and INV-2.

TABLE 4

| w % of components | INV-1 | INV-2 |
| --- | --- | --- |
| DISP-1 | 89.25 | — |
| DISP-2 | — | 89.25 |
| Tone modifier 1 | 0.53 | 0.53 |
| Reductor 1 | 4.64 | 4.64 |
| Stabilizer 1 | 0.12 | 0.12 |
| Stabilizer 2 | 0.12 | 0.12 |
| IC 819 | 0.89 | 0.89 |
| TPO-L | 0.89 | 0.89 |
| ITX | 1.78 | 1.78 |
| EPD | 1.78 | 1.78 |

The viscosity of the radiation curable composition INV-1 and INV-2 were measured and found to be 770 mPa·s respectively 200 mPa·s.

Preparation of Laminated Safety Glass SG-1

Two glass samples were prepared by coating the inventive radiation curable formulation INV-1 on one side of each glass plate, having a thickness of 1.9 mm, using a 20 μm bar. Each sample was cured using a 395 nm 12 W LED. Each sample was passed three times under the LED at a belt speed of 30 m/min. An additional layer of the radiation curable composition INV-1 was coated on top of the cured layer using a 20 μm bar and the samples were cured using a 395 nm 12 W LED. Each sample was passed three times under the LED at a belt speed of 30 m/min. The curing was evaluated using scratching the surface with a Q-tip as evaluation method. None of the samples could be damaged and were considered as fully cured.

An assembly of the two glass plates was made by sandwiching a polyvinyl butyral foil (Butacite™ B52 supplied by DUPONT) between the two glass plates, with the cured coatings in contact with the polyvinyl butyral foil. The assembly was placed in an oven at 200° C. for 30 seconds and laminated using a pressure of 380 kg/m².

After lamination, the sample SG-1 exhibited an optical density of 3.5 and a reddish black image tone.

Preparation of Laminated Safety Glass SG-2

Two glass samples were prepared by coating the radiation curable composition INV-2 on one side of each glass plate, having a thickness of 1.9 mm, using a 20 μm bar. Each sample was cured using a 395 nm 12 W LED. Each sample was passed three times under the LED at a belt speed of 30 m/min. An additional layer of the radiation curable composition INV-2 was coated on top of the cured layer using a 20 μm bar and the samples were cured using a 395 nm 12 W LED. Each sample was passed three times under the LED at a belt speed of 30 m/min. The curing was evaluated using scratching the surface with a Q-tip as evaluation method. None of the samples could be damaged and were considered as fully cured.

An assembly of the two glass plates was made by sandwiching a polyvinyl butyral foil (Butacite™ B52 supplied by DUPONT) between the two glass plates, with the cured coatings in contact with the polyvinyl butyral foil. The assembly was placed in an oven at 200° C. for 30 seconds and laminated using a pressure of 380 kg/m².

After lamination, the sample SG-2 had an optical density of more than 4.0 and a reddish black image tone.

Preparation of Laminated Safety Glass SG-3

A polyvinyl butyral foil (Butacite™ B52, supplied by DUPONT) was coated on both sides with the radiation curable formulation INV-2, using a 20 μm bar. After each coating, the sample was cured using a 395 nm 12 W LED. The sample was passed three times under the LED using a belt speed of 30 m/min. On top of each cured layer, an additional layer of radiation curable composition INV-2 was coated using a 20 μm bar and the coating was cured using a 395 nm 12 W LED. Each coating was passed three times under the LED at a belt speed of 30 m/min. The curing was evaluated using scratching the surface with a Q-tip as evaluation method. None of the coatings could be damaged and were considered as fully cured.

The coated and cured polyvinyl butyral foil was sandwiched between two glass plates (thickness 1.9 mm) and the assembly was placed in an oven at 200° C. for 6 minutes and laminated using a pressure of 380 kg/m².

After lamination, the sample SG-3 exhibited an optical density of 3.0 and a neutral black image tone.

REFERENCE SIGNS LIST

TABLE 5

| 1 | Windshield | 33 | Enamel ink printed inner glass layer |
| 2 | Laminated glass | 36 | Bent outer glass layer |
| 3 | UV light blocking border | 37 | Interlayer |
| 4 | UV light blocking area | 38 | Bent enamel ink printed inner glass layer |
| 5 | Central part of the windshield | 39 | Autoclave |
| 21 | Inner glass layer | 40 | Cleaning |
| 22 | Interlayer | 41 | Ready-to-use windshield |
| 23 | Outer glass layer | 42 | Flat windshield shaped glass layer |
| 24 | Vehicle frame | 43 | Printed interlayer |
| 25 | Enamel UV light blocking border | 44 | Bent unprinted inner glass layer |
| 26 | Adhesive | 45 | Enamel ink printing |
| 27 | Acid rain penetration | 46 | Layer of radiation curable composition |
| 28 | Rubber seal | 47 | Functional conductive pattern |
| 31 | Raw glass | | |
| 32 | Marking up & cutting | | |
| 34 | Cleaning | | |
| 35 | Furnace | | |

The invention claimed is:

1. A radiation curable composition comprising:
   at least one organic silver salt;
   at least one reducing agent for the at least one organic silver salt; and
   a polymerizable composition including at least one polymerizable compound; wherein
   the at least one polymerizable compound includes at least 50 wt % of a monofunctional polymerizable compound based on a total weight of the polymerizable composition, and the monofunctional polymerizable compound is a monomer including at least an acetal group or a ketal group.

2. The radiation curable composition according to claim 1, wherein the at least one organic silver salt includes silver behenate.

3. The radiation curable composition according to claim 1, wherein the monomer including at least the acetal group or the ketal group is a monofunctional (meth)acrylate including at least one five or six membered acetal ring.

4. The radiation curable composition according to claim 1, further comprising a polyvinylacetal having an average molar mass MW of less than 50,000 g/mol.

5. The radiation curable composition according to claim 1, wherein the radiation curable composition includes at least 70 wt % of one or more monofunctional acrylates based on the total weight of the polymerizable composition; and
   homopolymers of the at least one monofunctional acrylate have a glass transition temperature of not more than 100° C.

6. A method of manufacturing an article comprising the steps of:
   applying imagewise the radiation curable composition according to claim 1 on a support;
   curing the applied radiation curable composition by actinic radiation; and
   converting the at least one organic silver salt in the radiation curable composition to silver metal with a thermal treatment.

7. The method according to claim 6, wherein the article is a laminated safety glass.

8. The method according to claim 6, wherein the radiation curable composition is applied by inkjet printing.

9. The method according to claim 6, wherein the actinic radiation is selected from the group consisting of UV light radiation and electron beam radiation.

* * * * *